United States Patent [19]

Kohyama et al.

[11] 4,429,103

[45] Jan. 31, 1984

[54] METHOD FOR PREPARATION OF AROMATIC POLYESTER-POLYCARBONATE

[75] Inventors: Katsuhisa Kohyama, Kitakyushu; Katsuyuki Sakata, Nakama; Shinji Ono, Kitakyushu, all of Japan

[73] Assignee: Mitsubishi Chemical Industries, Limited, Tokyo, Japan

[21] Appl. No.: 360,000

[22] Filed: Mar. 19, 1982

[30] Foreign Application Priority Data

Apr. 21, 1981 [JP] Japan ............................ 56-60225

[51] Int. Cl.$^3$ ............................................ C08G 63/64
[52] U.S. Cl. ................................. 528/176; 528/173; 528/191; 528/154
[58] Field of Search ............... 528/173, 176, 194, 191

[56] References Cited

U.S. PATENT DOCUMENTS 4,255,556  3/1981  Segal et al. ..................... 528/176
4,278,787  7/1981  Swart et al. .................... 528/176

Primary Examiner—Lester L. Lee
Attorney, Agent, or Firm—Oblon, Fisher, Spivak, McClelland & Maier

[57] ABSTRACT

An aromatic polyesterpolycarbonate containing a dihydroxy-diaryl compound residue, a terephthalic acid residue and/or isophthalic acid residue, and a carbonate bond in a molar ratio of 1:0.25–0.75:0.75–0.25 is prepared by first mixing and reacting an aqueous alkaline solution of a dihydroxy-diaryl compound, an organic solvent solution of terephthaloyl chloride and/or isophthaloyl chloride, and phosgene to obtain a polyesterpolycarbonate oligomer having —OCOCl groups, —COCl groups and —OH groups as end groups and then subjecting the oligomer to polycondensation with a caustic alkali in the substantial absence of the dihydroxy-diaryl compound.

8 Claims, No Drawings

METHOD FOR PREPARATION OF AROMATIC POLYESTER-POLYCARBONATE

BACKGROUND OF THE INVENTION

This invention relates to a preparation method of an aromatic polyesterpolycarbonate, and more particularly to a method for preparing an aromatic polyester-polycarbonate of high purity advantageously from the industrial viewpoint.

DESCRIPTION OF THE PRIOR ART

As a known preparation method of an aromatic polyesterpolycarbonate, an aqueous alkaline solution of a dihydroxy-diaryl compound and an organic solvent solution of terephthaloyl chloride or the like are mixed to obtain an oligomer having —OH groups as its end groups, to which phosgene is reacted to yield another oligomer having —OCOCl groups as its end groups. An organic solvent solution of the latter oligomer is then reacted with an aqueous alkaline solution of the dihydroxy-diaryl compound to undergo a polycondensation reaction (see, Japanese Patent Laid-open No. SHO 55-25427).

Although the above method provides an aromatic polyesterpolycarbonate having excellent physical and chemical properties, the mixing of unreacted dihydroxy-diaryl compound in an organic solvent solution of its final product resin is unavoidable because the dihydroxy-diaryl compound is used in the polycondensation step and a portion of the dihydroxy-diaryl compound still remains unreacted even after the completion of the polycondensation.

It is not easy to remove the thus-mixed dihydroxy-diaryl compound from the organic solvent solution even if the organic solvent solution is subjected to purification, for example, washed with an aqueous washing solution. Thus, the dihydroxy-diaryl compound remains as an impurity in a resin to be obtained from the organic solvent solution and becomes a cause affecting deleteriously on various properties of the resin.

Furthermore, the aromatic polyesterpolycarbonate prepared in accordance with the above prior art method seems to contain at its ends a few —COOH and —OH groups, whereby aggravating the separativeness of the organic solvent solution from the aqueous washing solution or vice versa upon washing the organic solvent solution of the resin and, therefore, making the purification of the resin difficult.

SUMMARY OF THE INVENTION

The present inventors have carried out an extensive research with a view to preparing aromatic polyester-polycarbonates containing little impurities and having excellent quality. As a result, it has been found that a highly pure aromatic polyesterpolycarbonate, whose organic solvent solution features good washing capacity, may be obtained when a specific polyesterpolycarbonate oligomer is subjected to polycondensation under specific conditions, thereby leading to the completion of this invention.

An object of this invention is thus to provide an aromatic polyesterpolycarbonate advantageously from the industrial standpoint. The above object can be attained by mixing and reacting an aqueous alkaline solution of a dihydroxy-diaryl compound, an organic solvent solution of terephthaloyl chloride and/or isophthaloyl chloride, and phosgene to obtain a polyesterpolycarbonate oligomer containing as end groups —OCOCl groups, —COCl groups and —OH groups, in which the molar ratio of the —OH groups to the (—OCOCl+—COCl) groups is not higher than 1 and the molar ratio of the —COCl groups to the —OCOCl groups is 2.5 or smaller, and then subjecting the thus-obtained oligomer to polycondensation with a caustic alkali in the substantial absence of the dihydroxy-diaryl compound, thereby to prepare in accordance with the interfacial polymerization an aromatic polyesterpolycarbonate containing a dihydroxy-diaryl compound residue, a terephthalic acid residue and/or isophthalic acid residue, and a carbonate bond in a molar ratio of 1:0.25–0.75:0.75–0.25.

DETAILED DESCRIPTION OF PREFERRED EMBODIMENTS

The dihydroxy-diaryl compound usable in the present invention may be any one of compounds represented by the general formula:

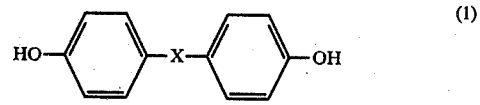

wherein X means a divalent group indicated by

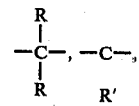

—O—, —S— or —SO$_2$—, R being a hydrogen atom or a monovalent hydrocarbon group and R' standing for a divalent hydrocarbon group, and the aromatic rings may contain one or more halogen atoms or monovalent hydrocarbon groups. As specific examples of the dihydroxy-diaryl compound, may be mentioned: bis(hydroxyaryl)alkanes such as bis(4-hydroxyphenyl)methane, 1,1-bis(4-hydroxyphenyl)ethane, 2,2-bis(4-hydroxyphenyl) propane(bisphenol A), 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 1,1-bis(4-hydroxy-3-t-butylphenyl)propane, 2,2-bis(4-hydroxy-3-bromophenyl) propane, 2,2-bis(4-hydroxy-3,5-dibromophenyl)propane, and 2,2-bis(4-hydroxy-3,5-dichlorophenyl)propane; bis(hydroxyaryl)cycloalkanes such as 1,1-bis(4-hydroxyphenyl)cyclopentane and 1,1-bis(4-hydroxyphenyl)cyclohexane; dihydroxy-diaryl ethers such as 4,4'-dihydroxydiphenyl ether and 4,4'-dihydroxy-3,3'-dimethyldiphenyl ether; dihydroxy-diaryl sulfides such as 4,4'-dihydroxydiphenyl sulfide and 4,4'-dihydroxy-3,3'-dimethyldiphenyl sulfide; dihydroxy-diaryl sulfoxides such as 4,4'-dihydroxydiphenyl sulfoxide and 4,4'-dihydroxy-3,3'-dimethyldiphenyl sulfoxide; and dihydroxy-diaryl sulfones such as 4,4'-dihydroxydiphenyl sulfone and 4,4'-dihydroxy-3,3'-dimethyldiphenyl sulfone.

As a suitable alkali to prepare an aqueous alkaline solution of such a dihydroxy-diaryl compound, may be mentioned a caustic alkali such as sodium hydroxide, potassium hydroxide or lithium hydroxide. From the industrial viewpoint, sodium hydroxide is preferred.

The terephthaloyl chloride and/or isophthaloyl chloride may also include those containing one or more halogen atoms such as chlorine and bromine atoms or one or more monovalent hydrocarbon groups such as methyl groups attached to their benzene rings. Exemplary terephthaloyl chlorides and isophthaloyl chlorides include methylterephthaloyl chloride, chloroterephthaloyl chloride, 2,5-dimethylterephthaloyl chloride, methylisophthaloyl chloride and chloroisophthaloyl chloride.

Any organic solvent may be used as a solvent for such terephthaloyl chloride and/or isophthaloyl chloride so long as it is insoluble in water. As examples of such organic solvents, may be mentioned chlorinated hydrocarbons such as methylene chloride, chloroform, dichloroethane, trichloroethane, tetrachloroethane, 1,2-dichloroethylene and dichlorobenzene. It is also feasible to employ each of such chlorinated hydrocarbons as a mixed solvent with another organic solvent such as dioxane, tetrahydrofuran, acetophenone, toluene, xylene, cyclohexane, acetone, n-heptane or the like. It is preferred to employ methylene chloride from the industrial standpoint.

In the method according to this invention, a polyesterpolycarbonate oligomer containing as end groups —OCOCl groups, —COCl groups and —OH groups, in which the overall molar ratio of the —OH groups to the (—OCOCl+—COCl) groups is not higher than 1 and the overall molar ratio of the —COCl groups to the —OCOCl groups is 2.5 or smaller, is prepared first of all using the above-mentioned raw materials and phosgene.

The term "terminal —COCl groups" as used herein does not embrace those coupled with an oxygen atom but means only those bonded with carbon atoms. On the other hand, by "terminal —OH groups" as used herein are not included terminal —OH groups coupled with the carbon atom of a carbonyl group. In other words, the terms "terminal —COCl groups", "terminal —OH groups" and "terminal —OCOCl groups" mean individually those bonded with a carbon atom in an aromatic ring.

The above oligomer may for example be prepared by mixing and reacting an aqueous alkaline solution of a dihydroxy-diaryl compound, an organic solvent solution of terephthaloyl chloride and/or isophthaloyl chloride, and phosgene. Upon carrying out the above reaction, each of the reaction raw materials may be added one after another into a reaction mixture. Alternatively, the dihydroxy-diaryl compound or phosgene may be incorporated at the end so as to adjust the molar ratio of the end groups of the resulting oligomer.

The dihydroxy-diaryl compound, terephthaloyl chloride and/or isophthaloyl chloride and phosgene may suitably be used in such amounts that the molar ratio of (terephthaloyl chloride and/or isophthaloyl chloride+-phosgene) to the dihydroxy-diaryl compound is 0.8-2.0, preferably, 0.9-1.5 or so while that of phosgene to (terephthaloyl chloride and/or isophthaloyl chloride) ranges 0.4-4, preferably, 0.7-2 or so.

The intended resin of excellent properties may not be obtained if terephthaloyl chloride and/or isophthaloyl chloride are used either too much or too little. Especially, when used excessively, they are subjected to hydrolysis in the course of the reactor, whereby bringing about such inconvenience that the oligomer is mixed with a resultant acid or the oligomer contains terminal —COOH groups.

Use of phosgene in an excessively small amount fails to increase the number of terminal —OCOCl groups. On the other hand, the oligomerization reaction is not hampered even if phosgene is used in a great amount. However, no special effect would not be expected from the use of phosgene in such a great amount. More phosgene will be decomposed as its amount increases. Thus, it is disadvantageous to employ phosgene too much.

The oligomerization reaction proceeds at a high speed. Thus, it may be carried out using a flow-type reaction vessel such as packed column, orifice column, plate column or hollow column or a mixer such as pin mixer. No special limitation is vested to the reaction temperature or reaction pressure. Heating or cooling is not normally required.

A reaction mixture, which has gotten through with the oligomerization reaction, is an emulsion of the organic solvent solution of the oligomer and an aqueous phase containing a by-product alkali chloride. The oligomer may be subjected to a polycondensation reaction as is, namely, in the emulsion form, as the organic solvent solution after allowing the emulsion to stand and separating it into the organic solvent solution and aqueous phase, or in a solid form subsequent to removing the oligomer as a solid from the organic solvent solution.

The separativeness of the organic solvent phase from the aqueous phase or vice versa after the completion of the oligomerization reaction may be improved when a tertiary amine such as trimethylamine, triethylamine, tri-n-propylamine, or tri-n-butylamine, an aminopyridine such as dimethylaminopyridine, or a quaternary ammonium salt such as trimethylbenzyl ammonium chloride is present in the oligomerization reaction. Its effect may not be enhanced even if it is used in a considerably great amount. In the case of a tertiary amine, the number of terminal —COCl groups in each oligomer tends to increase as its amount goes higher. Thus, an aminopyridine or quaternary ammonium salt is generally employed in an amount of not greater than 2 g or so, or preferably, in the range of 0.1–1 g or so per liter of the organic solvent while a tertiary amine may be used in an amount of 0.5 g or less, or preferably, in the range of 0.01–0.3 g or so per liter of the organic solvent.

It is necessary for the oligomer of this invention that the molar ratio of its terminal —OH groups to its terminal (—OCOCl+—COCl) groups is not greater than 1. If this molar ratio exceeds 1, a resin containing unreacted terminal —OH groups will result upon carrying out a polycondensation reaction with a caustic alkali in accordance with this invention. Accordingly, it is impossible to obtain resins excellent in their properties. Moreover, the washing capacity of an organic solvent solution containing such a resin will be poor. On the other hand, no inconvenience will be encountered at all when the above molar ratio becomes smaller. Such a small molar ratio is rather desirous. Since the above molar ratio cannot be lowered to 0 when the oligomer is prepared in a manner described above, it is generally recommendable to use oligomers in which the above-described molar ratio is 0.01–0.9 or so.

Regarding the ratio of terminal —OCOCl groups to terminal —COCl, it is necessary that the molar ratio of —COCl groups to —OCOCl groups is 2.5 or smaller. Any molar ratio exceeding 2.5 impedes the proceeding of the polycondensation reaction by a caustic alkali, resulting in failure to obtain a resin of a high molecular weight. On the other hand, no inconvenience will be encountered when the molar ratio becomes smaller. It is rather desirous to employ a small molar ratio. However, it is generally recommendable to use an oligomer having the above-defined molar ratio in the range of 0.25–2.0 or so because the molar ratio cannot be lowered to 0 when the oligomer is prepared in the above method.

The polycondensation reaction of this invention is carried out by the interfacial polymerization method, i.e., by mixing an organic solvent solution of the above-enumerated oligomer, an aqueous caustic alkali solution, a catalyst and a terminator as well as an organic solvent if necessary.

It is preferred to avoid the presence of a dihydroxy-diaryl compound in the polycondensation reaction according to this invention, since its presence does not cause any inconvenience to the polycondensation reaction per se but unreacted dihydroxy-diaryl compound remains even after the completion of the reaction and is inconveniently mixed in the resulting resin.

The organic solvent and caustic alkali to be used in the polycondensation reaction may be those employed upon preparing the oligomer. As suitable catalysts for the polycondensation reaction, may be mentioned the tertiary amines, aminopyridines and quarternary ammonium salts, which have been referred to in the above.

As terminator, may be mentioned phenols such as p-tert.-butylphenol, p-phenylphenol, o-phenylphenol and phenol per se.

The caustic alkali may be employed in at least such an amount that it always keeps the polycondensation system alkaline during the polycondensation reaction. It may be added at once to the polycondensation reaction system upon initiation of the polycondensation reaction. Alternatively, it may be added portion by portion along the proceeding of the polycondensation reaction. No particular inconvenience will be caused even if the caustic alkali is used excessively, except for the economical drawback due to its wasting. Accordingly, it is desirous to add the caustic alkali at the beginning of the polycondensation reaction in such an excess amount that the caustic alkali concentration in the water phase will be at least 0.05 N, and preferably, 0.1 N–1 N or so at the end of the polycondensation reaction.

The polycondensation reaction may be satisfactorily carried out in the vicinity of room temperature and atmospheric pressure. The reaction time may range from 0.5 to 5 hours, but 1–3 hours are generally sufficient to complete the polycondensation reaction.

In view of varied properties of the aromatic polyesterpolycarbonate to be prepared in accordance with this invention, for example, its thermal stability, mechanical properties and transparency, it is desirous to use the raw materials in such amounts that the molar ratio of a dihydroxy-diaryl compound residue:terephthalic acid and/or isophthalic acid residues:carbonate bond in the resultant aromatic polyesterpolycarbonate be 1:0.25–0.75:0.75–0.25 or so, or preferably, 1:0.33–0.7:0.67–0.3 or so, or more preferably 1:0.33–0.6:0.67–0.4 or so.

It should be noted that the above molar ratio was obtained in accordance with an I.R. absorption spectrum analysis, i.e., on the basis of the ratio of peaks at 1,740 cm$^{-1}$ (—COO— group) and at 1,770 cm$^{-1}$ (—OCOO— group).

On the other hand, the intrinsic viscosity $[\eta]$ was calculated in accordance with the following equation:

$$\eta_{sp}/C = [\eta] + 0.427[\eta]^2 C$$

on the basis of an $\eta_{sp}$ determined at 20° C. using 0.6 g/dl methylene chloride solution. The specific viscosity is preferably 0.4–1.5, and more preferably, 0.43–1.1.

The polycondensation reaction of this invention appears to proceed as a result that terminal —OH groups of the oligomer couple with its terminal —OCOCl groups and —COCl groups while giving off hydrochloric acid and some —OCOCl groups are hydrolyzed into —OH groups, which are immediately combined with remaining —OCOCl groups or —COCl groups due to removal of hydrochloric acid.

It is known that a —COCl group is generally converted to a —COOH group when subjected to hydrolysis. The thus-formed —COOH group may adversely affect the thermal stability of the resin because it remains as an end group in the resin or forms an undesirous bond such as an acid anhydride bond upon reaction with a —OCOCl group or the like. However, when the method of this invention is followed, the resultant resin contains few terminal —COOH groups and enjoys good thermal stability even if its starting oligomer contains terminal —COCl groups as much as up to 2.5 times in molar ratio its terminal —OCOCl groups.

The reaction mixture after the completion of the condensation reaction consists of an organic solvent solution of the resultant resin and an aqueous alkali chloride solution. Thus, it can be separated through stationary separation to obtain the organic solvent solution of the resin.

The organic solvent solution of the resultant resin is purified by washing it with water and an aqueous washing solution such as an aqueous dilute acid solution. Upon causing its organic solvent to evaporate or in a similar manner, the resin can be obtained in a solid form.

In the method of this invention, the presence of a dihydroxy-diaryl compound is substantially avoided during the polycondensation reaction, resulting in an extremely low level of unreacted dihydroxy-diaryl compound to be left in the reaction mixture and, corollary to this, an extremely low level of the dihydroxy-diaryl compound to be mixed as an impurity in the final resin product.

Since the resultant resin contains fewer —COOH and —OH groups, the organic solvent solution of the resin can be readily washed and can thus be purified sufficiently. Coupled with the aforementioned low content of the dihydroxy-diaryl compound in the final resin product, the method according to this invention can prepare aromatic polyesterpolycarbonates having an extremely high purity and excellent physical and chemical properties.

The invention will hereinafter be described more specifically in the following examples. It should however be noted that the scope of the present invention is not limited to the following examples but many changes and modifications may be made thereto without departing from the spirit of the invention. In the examples, all "parts" and "%" will mean "parts by weight" and "%" by weight" respectively.

The contents of —OCOCl groups and —COCl groups were respectively calculated by determining the total Cl content in an oligomer or resin through its decomposition and also by methanol-esterifying the oligomer or resin and measuring the ratio of esters of both groups by means of NMR.

The concentration of —OH groups in each oligomer or resin was determined in accordance with the colorimetry method which depended on a color-development reaction of titanium tetrachloride.

The concentration of —COOH groups in each oligomer or resin was quantitatively analyzed through a titration with a sodium hydroxide-ethanol solution.

The water content in each oligomer or resin was determined by the Karl Fisher's method.

EXAMPLE 1

A solution containing 16.5 parts of bisphenol A, 0.43 part of p-tert-butylphenol and 0.014 part of triethylamine dissolved in 100 parts of a 5.6% aqueous NaOH solution, a 4% methylene chloride solution of terephthaloyl chloride and phosgene were charged respectively at rates of 43 kg/hr, 56 kg/hr and 1.22 kg/hr into a tubular reactor of 6 mm in inner diameter and 14 m in length and subjected to an oligomerization reaction.

A reaction mixture flown out of the tubular reactor through its outlet separated into a methylene chloride phase, which contained an oligomer, and a water phase as soon as it entered a receptacle.

The methylene chloride solution of the oligomer, separated from the reaction mixture, contained as its end groups 0.061 eq./l of —OCOCl groups, 0.113 eq./l of —COCl groups and 0.026 eq./l of —OH groups, in which the molar ratio of the —OH groups to the (—OCOCl+—COCl) groups was 0.15 while the molar ratio of the —COCl groups to the —OCOCl groups was 1.85.

Charged in a 1-liter separable flask equipped with a baffle, were 550 ml of a 1% aqueous NaOH solution and 0.03 g of triethylamine, followed by a further addition with stirring of 300 ml of the above methylene chloride solution of the oligomer. A polycondensation reaction was carried out for 2 hours.

Upon stopping the stirring after the completion of the reaction, the reaction mixture immediately started its separation and, 30 seconds later, separated completely into a methylene chloride phase containing a resin and a water phase.

The thus-separated methylene chloride solution of the resin was added with 770 ml of methylene chloride to form a methylene chloride solution of 3% resin concentration, which was then subjected to a three-step washing treatment, each consisting of agitation and mixing and subsequent stationary separation, under the conditions given in Table 1. The separativeness of the methylene chloride phase from the aqueous washing solution phase and vice versa in each washing step as well as the water content in the methylene chloride solution after its separation are also known in Table 1.

TABLE 1

| Step | Aqueous washing solution | Agitation and mixing Ratio of water phase | Time (min) | Stationary separation Time (min) | Separativeness | Water content in methylene chloride solution (%) |
|---|---|---|---|---|---|---|
| 1 | 0.1 N—HCl | 1.5 | 10 | 0.5 | good | 0.31 |
| 2 | water | 1.5 | 10 | 15 | good | 0.29 |
| 3 | water | 1.5 | 10 | 15 | good | 0.29 |

The ratio of water phase means a weight ratio of water phase to its corresponding methylene chloride phase.

The methylene chloride solution of the resin, obtained through the aforementioned washing purification, was then concentrated and dried to provide a film-like resin. Its analyses gave the following results:

[η]=0.55;
Bisphenol A residue:terephthalic acid residue:carbonate bond=1:0.48:0.52 in molar ratio;
—OH group content: 4.7 μeq./g;
—COOH group content: 7.2 μeq./g;
Residual bisphenol A: 140 ppm; and
Neither —OCOCl group nor —COCl group were detected, indicating the completion of the polymerization reaction.

After heating the resin for 5 minutes in a melt indexer maintained at 300° C., the resin was extruded. [η] of the thus-extruded resin was 0.55.

EXAMPLE 2

A solution containing 16.5 parts of bisphenol A and 0.02 part of triethylamine dissolved in 100 parts of a 5.6% aqueous NaOH solution, a 4% methylene chloride solution of terephthaloyl chloride and phosgene were charged respectively at rates of 25 kg/hr, 56 kg/hr and 1.17 kg/hr into the same tubular reactor as that used in Example 1 and subjected to an oligomerization reaction. A part of the resultant reaction mixture was sampled and subjected to stationary separation, thereby obtaining a methylene chloride solution of an oligomer, which contained 0.21 eq./l of —OCOCl groups, 0.22 eq./l of —COCl groups and 0.01 eq./l of —OH groups. The molar ratio of the —OH groups to the (—OCOCL+—COCl) groups was 0.023 while that of the —COCl groups to the —OCOCl groups was 1.05.

Into a 1 liter-separable flask equipped with a baffle, were charged 400 ml of a 1% aqueous NaOH solution, 0.03 g of triethylamine and 1.3 g of p-tert-butyphenol. While stirring the thus-charged mixture, 500 ml of the reaction mixture flown out of the tubular reactor was added into the reactor and the resultant mixture was subjected to a polycondensation reaction for 2 hours.

The reaction mixture was separated to obtain a methylene chloride solution of a resultant resin, to which was added 800 ml of methylene chloride to adjust the resin concentration to 3%. It was then washed in the same manner as in Example 1. The separativeness of the methylene chloride solution and the water content in the thus-separated methylene chloride solution are shown in Table 2.

TABLE 2

| Step | Aqueous washing solution | Agitation and mixing Ratio of water phase | Time (min) | Stationary separation Time (min) | Separativeness | Water content in methylene chloride solution (%) |
|---|---|---|---|---|---|---|
| 1 | 0.1 N—HCl | 1.5 | 10 | 0.5 | good | 0.29 |
| 2 | water | 1.5 | 10 | 17 | good | 0.26 |
| 3 | water | 1.5 | 10 | 20 | good | 0.25 |

The thus-washed and purified methylene chloride solution of the resin was then evaporated to dryness, thereby providing the resin. Its analyses gave the following results:

[η]=0.54;
Bisphenol A residue:terephthalic acid residue:carbonate bond=1:0.50:0.50 in molar ratio;
—OH group content: 3.6 μeq./g;

—COOH group content: 6.5 μeq./g;
Residual bisphenol A: 120 ppm; and
Neither —OCOCl group nor —COCl group were traced.

After heating the resin for 5 minutes in a melt indexer maintained at 300° C., the resin was extruded. [η] of the thus-extruded resin was 0.54.

EXAMPLE 3

Into 300 ml of the methylene chloride solution of the oligomer obtained through the same oligomerization reaction as in Example 1, were added 550 ml of water and 22 g of a solution obtained by dissolving 16.5 parts of bisphenol A in a 5.6% aqueous NaOH solution. The resultant mixture was stirred for one hour to adjust the ratio of end groups of the oligomer.

The reaction mixture was separate to obtain a methylene chloride solution of the thus-adjusted oligomer, which contained 0.034 eq./l of —OCOCl groups, 0.052 eq./l of —COCl groups and 0.06 eq./l of —OH groups. The molar ratio of the —OH groups to the (—OCOCl-+—COCl) groups was 0.70 while the molar ratio of the —COCl groups to the —OCOCl groups was 1.53.

The thus-obtained methylene chloride solution of the oligomer, 550 ml of a 0.7% aqueous NaOH solution, 0.03 g of triethylamine and 1.2 g of p-tert-butylphenol were charged into a 1 liter-separable flask equipped with a baffle and subjected to a polycondensation reaction for 2 hours with stirring.

A methylene chloride solution of a resulting resin, obtained by separating the reaction mixture, was diluted with 770 ml of methylene chloride to adjust its resin concentration to 3%. It was then washed in the same manner as in Example 1. The separativeness of the methylene chloride solution and the water content in the thus-separated methylene chloride solution are given in Table 3.

TABLE 3

| | | Agitation and mixing | | | | Water content of methylene chloride solution (%) |
|---|---|---|---|---|---|---|
| | Aqueous washing | Ratio of water | Time | Stationary separation | | |
| Step | solution | phase | (min) | Time (min) | Separativeness | |
| 1 | 0.1 N—HCl | 1.5 | 10 | 0.5 | good | 0.29 |
| 2 | water | 1.5 | 10 | 15 | good | 0.26 |
| 3 | water | 1.5 | 10 | 15 | good | 0.27 |

The thus-washed and purified methylene chloride solution of the resin was then evaporated to dryness, thereby obtaining the resin. Its analyses gave the following results:

[η]=0.54;
Bisphenol A residue:terephthalic acid residue:carbonate bond=1:0.49:0.51 in molar ratio;
—OH group content: 5.1 μeq./g;
—COOH group content: 5.6 μeq./g;
Residual bisphenol A: 110 ppm; and
Neither —OCOCl group nor —COCl group were traced.

The resin was heated for 5 minutes in a melt indexer maintained at 300° C. and then extruded. [η] of the thus-extruded resin was 0.545.

EXAMPLE 4

A solution containing 16.5 parts of bisphenol A, 0.43 part of p-tert-butylphenol and 0.16 part of trimethylbenzyl ammonium chloride dissolved in 100 parts of a 5.6% aqueous NaOH solution, a 4% methylene chloride solution of terephthaloyl chloride and phosgene were charged respectively at rates of 30 kg/hr, 56 kg/hr and 1.22 kg/hr into the same tubular reactor as in Example 1 and subjected to an oligomerization reaction, followed by separation of the reaction product.

The methylene chloride solution of the resultant oligomer contained 0.12 eq./l of —OCOCl groups, 0.11 eq./l of —COCl groups and 0.08 eq./l of —OH groups. The molar ratio of the —OH groups to the (—OCOCl-+—COCl) groups was 0.35 while the molar ratio of the —COCl groups to the —OCOCl groups was 0.92.

Into a 1 liter-separable flask equipped with a baffle, were charged 550 ml of a 1% aqueous NaOH solution and 0.03 part of triethylamine, followed by a further addition of 300 ml of the above methylene chloride solution of the oligomer while stirring the mixture. They were then subjected for 2 hours to a polycondensation reaction.

A methylene chloride solution of a resulting resin, separated from the reaction mixture, was then added with 770 ml of methylene chloride to adjust its resin concentration to 3%. It was then washed in the same manner as in Example 1. The separativeness of the methylene chloride solution and the water content of the thus-separated methylene chloride solution are given in Table 4.

TABLE 4

| | | Agitation and mixing | | | | Water content of methylene chloride solution (%) |
|---|---|---|---|---|---|---|
| | Aqueous washing | Ratio of water | Time | Stationary separation | | |
| Step | solution | phase | (min) | Time (min) | Separativeness | |
| 1 | 0.1 N—HCl | 1.5 | 10 | 0.5 | good | 0.32 |
| 2 | water | 1.5 | 10 | 15 | good | 0.25 |
| 3 | water | 1.5 | 10 | 20 | good | 0.28 |

The thus-washed and purified methylene chloride solution of the resin was evaporated to dryness, thereby obtaining the resin. Its analyses gave the following results:

[η]=0.56;
Bisphenol A residue:terephthalic acid residue:carbonate bond=1:0.48:0.52 in molar ratio;
—OH group content: 3.9 μeq./g;
—COOH group content: 6.2 μeq./g;
Residual bisphenol A: 140 ppm; and
Neither —OCOCl group nor —COCl group were traced.

The resin was heated for 5 minutes in a melt indexer maintained at 300° C. and then extruded. [η] of the thus-extruded resin was 0.555.

COMPARATIVE EXAMPLE 1

Into a 1 liter-separable flask equipped with a baffle, were charged 300 ml of the methylene chloride solution of the oligomer resulted from the same oligomerization reaction as in Example 1 and a solution containing 550 ml of a 2% aqueous NaOH solution and 22 g of bisphenol A and 0.03 g of triethylamine, both, dissolved in the aqueous NaOH solution. They were subjected to a polycondensation reaction for 2 hours with stirring.

The reaction mixture was separated to provide a methylene chloride solution of a resulting resin, to which 770 ml of methylene chloride was added to adjust its resin concentration to 3%. It was then washed in the same manner as in Example 1. The separativeness of the methylene chloride solution and the water content in the thus-separated methylene chloride solution are given in Table 5.

TABLE 5

| | Agitation and mixing | | | Stationary separation | | Water content of methylene chloride solution (%) |
|---|---|---|---|---|---|---|
| Step | Aqueous washing solution | Ratio of water phase | Time (min) | Time (min) | Separativeness | |
| 1 | 0.1 N— HCl | 1.5 | 10 | 0.5 | good | 0.51 |
| 2 | water | 1.5 | 10 | 20 | good | 0.33 |
| 3 | water | 1.5 | 10 | 25 | good | 0.32 |

The thus-washed and purified methylene chloride solution of the resin was evaporated to dryness, thereby obtaining the resin. Its analyses gave the following results:

$[\eta] = 0.56$;

Bisphenol A residue:terephthalic acid residue:carbonate bond = 1:0.49:0.51 in molar ratio;

—OH group content: 9.2 μeq./g;

—COOH group content: 16.0 μeq./g;

Residual bisphenol A: 820 ppm; and

Neither —OCOCl groups nor —COCl groups were traced.

The resin was heated for 5 minutes in a melt indexer maintained at 300° C. and extruded. $[\eta]$ of the thus-extruded resin was 0.54.

COMPARATIVE EXAMPLE 2

Into the same tubular reactor as that employed in Example 1, were charged a solution containing 16.5 parts of bisphenol A and 0.15 part of triethylamine dissolved in 100 parts of 5.6% aqueous NaOH solution, a 4% methylene chloride solution of terephthaloyl chloride and phosgene respectively at rates of 30 kg/hr, 56 kg/hr and 1.22 kg/hr to subject them to an oligomerization reaction, followed by separation of the reaction product.

The thus-obtained methylene chloride solution of the oligomer contained 0.05 eq./l of —OCOCl groups, 0.21 eq./l of —COCl groups and 0.01 eq./l of —OH groups. The molar ratio of the —OH groups to the (—OCOCl— +—COCl) groups was 0.038 whereas the molar ratio of the —COCl groups to the —OCOCl groups was 4.2.

Into a 1 liter-separable flask equipped with a baffle, were charged 550 ml of a 0.7% aqueous NaOH solution, 0.03 g of triethylamine and 1.2 g of p-tert-butylphenol, followed by a further addition with stirring of 300 ml of the above methylene chloride solution of the oligomer. They were subjected to a polycondensation reaction for 2 hours.

The reaction mixture was separated to give a methylene chloride solution of a resin, to which 770 ml of methylene chloride was added to adjust its resin concentration to 3%. It was then washed in the same manner as in Example 1. The separativeness of the methylene chloride solution and the water content in the thus-separated methylene chloride solution are tabulated in Table 6.

TABLE 6

| | Agitation and mixing | | | Stationary separation | | Water content of methylene chloride solution (%) |
|---|---|---|---|---|---|---|
| Step | Aqueous washing solution | Ratio of water phase | Time (min) | Time (min) | Separativeness | |
| 1 | 0.1 N— HCl | 1.5 | 10 | 15 | the methylene chloride solution clouded. | 0.78 |
| 2 | water | 1.5 | 10 | 90 | | 1.46 |
| 3 | water | 1.5 | 10 | 100 | | 1.30 |

The thus-washed and purified methylene chloride solution of the resin was then evaporated to dryness, thereby providing the resin. Its analyses gave the following results:

$[\eta] = 0.56$;

Bisphenol A residue:terephthalic acid residue:carbonate bond = 1:0.48:0.52 in molar ratio;

—OH group content: 8.1 μeq./g;

—COOH group content: 24.0 μeq./g;

Residual bisphenol A: 1,100 ppm; and

Neither —OCOCl groups nor —COCl groups were traced.

The resin was heated for 5 minutes in a melt indexer maintained at 300° C. and then extruded. $[\eta]$ of the thus-extruded resin was 0.51.

EXAMPLE 5

A solution containing 5.6% aqueous NaOH solution and bisphenol A dissolved therein in an amount of 16.5 parts per 100 parts of the aqueous NaOH solution, a 4% methylene chloride solution of terephthaloyl chloride and phosgene were charged respectively at rates of 21.7 kg/hr, 39.8 kg/hr and 0.88 kg/hr into the same tubular reactor as that used in Example 1, followed by separation of the reaction product.

The resulting methylene chloride solution of an oligomer contained 0.16 eq./l of —OCOCl groups, 0.06 eq./l of —COCl groups and 0.09 eq./l of —OH groups. The molar ratio of the —OH groups to the (—OCOCl— +—COCl) groups was 0.41 while that of the —COCl groups to the —OCOCl groups was 0.38.

Two hundred milliliters of a 3.8% aqueous NaOH solution, 1.3 g of p-tert-butylphenol and 0.02 g of triethylamine were charged into a 1 liter-separable flask equipped with a baffle, followed by a further addition with stirring of 500 ml of the above methylene chloride solution of the oligomer. The resultant mixture was subjected to a polycondensation reaction for 2 hours.

The reaction mixture was allowed to stand, thereby obtaining a methylene chloride solution of a resin, which was thereafter diluted with 900 ml of methylene chloride to adjust its resin concentration to 4%. The separativeness of the methylene chloride solution and the water content in the thus-separated methylene chloride solution are shown in Table 7.

TABLE 7

| Step | Agitation and mixing Aqueous washing solution | Ratio of water phase | Time (min) | Stationary separation Time (min) | Separa- tiveness | Water content of methylene chloride solution (%) |
|---|---|---|---|---|---|---|
| 1 | 0.1 N—HCl | 0.3 | 10 | 0.5 | good | 0.42 |
| 2 | water | 0.3 | 10 | 18 | good | 0.31 |
| 3 | water | 0.3 | 10 | 20 | good | 0.38 |

The thus-washed and purified methylene chloride solution of the resin was then evaporated to dryness, thereby obtaining the resin. Its analyses gave the following results:

$[\eta] = 54$

Bisphenol A residue:terephthalic acid residue:carbonate bond—1:0.53:0.47 in molar ratio;

—OH group content: 7.6 μeq./g;
—COOH group content: 3.7 μeq./g;
Residual bisphenol A: 180 ppm; and
Neither —OCOCl groups nor —COCl groups were traced.

The resin was heated for 5 minutes in a melt indexer maintained at 300° C. and then extruded. $[\eta]$ of the thus-extruded resin was 0.535.

EXAMPLE 6

A solution containing 16.5 parts of bisphenol A and 0.48 part of p-tert-butylphenol dissolved in 100 parts of a 5.6% aqueous NaOH solution, a 4% methylene chloride solution of terephthaloyl chloride and phosgene were charged respectively at rates of 36.0 kg/hr, 48.9 kg/hr and 3.7 kg/hr into the same tubular reactor as that used in Example 1 and subjected to an oligomerization reaction. The resultant reaction effluent was separated into a water phase and a methylene chloride phase. The methylene chloride phase of a resultant oligomer contained 0.30 eq./l of —OCOCl groups, 0.09 eq./l of —COCl groups and 0.22 eq./l of —OH groups. The molar ratio of the —OH groups to the (—OCOCl+—COCl) groups was 0.56 while that of the —COCl groups to the —OCOCl groups was 0.30.

The tubular reactor was operated under such conditions that the above-mentioned oligomer solution can be obtained. From the reaction effluent which was in the state of an emulsion consisting of the water phase and methylene chloride phase, 1,400 ml was collected as a sample. The sample emulsion was then placed in a 2 liter-mixing vessel equipped with a baffle. While thoroughly stirring the sample emulsion, 10 g of an aqueous 25% NaOH solution was added thereto. They were reacted for 30 minutes. The reaction solution was allowed to stand, thereby obtaining a methylene chloride solution of an oligiomer, which contained 0.21 eq./l of —OCOCl groups, 0.04 eq./l of —COCl groups and 0.10 eq./l of —OH groups. The molar ratio of the —OH groups to the (—OCOCl+—COCl) groups was 0.40 while that of the —COCl groups to the —OCOCl groups was 0.19.

Into a 1 liter-separable flask equipped with a baffle, were charged 200 ml of a 4.5% aqueous NaOH solution and 0.02 g of triethylamine. While stirring the content, 500 ml of the above methylene chloride solution of the oligomer was added. They were subjected to a polycondensation reaction for 1.5 hours.

The reaction mixture was allowed to stand. The thus-obtained methylene chloride solution of the resin was added with 900 ml of methylene chloride to adjust its resin concentration to about 4%. It was washed in the same manner as in Example 1. The separativeness of the methylene chloride solution and the water content in the thus-separated methylene chloride solution are given in Table 8.

TABLE 8

| Step | Agitation and mixing Aqueous washing solution | Ratio of water phase | Time (min) | Stationary separation Time (min) | Separa- tiveness | Water content of methylene chloride solution (%) |
|---|---|---|---|---|---|---|
| 1 | 0.1 N—HCl | 0.3 | 10 | 1 | good | 0.39 |
| 2 | water | 0.3 | 10 | 10 | good | 0.28 |
| 3 | water | 0.3 | 10 | 10 | good | 0.27 |

The thus-washed and purified methylene chloride solution of the resin was evaporated to dryness, thereby obtaining the resin. Its analyses gave the following results:

$[\eta] = 0.49$;

Bisphenol A residue:terephthalic acid residue:carbonate bond = 1:0.49:0.51 in molar ratio;

—OH group content: 6.5 μeq./g;
—COOH group content: 4.3 μeq./g;
Residual bisphenol A: 210 ppm; and
Neither —OCOCl groups nor —COCl were traced.

The resin was heated for 5 minutes in a melt indexer maintained at 300° C. and then extruded. $[\eta]$ of the thus-extruded resin was 0.49.

EXAMPLE 7

Under the same conditions as those employed in Example 6, a tubular reaction was operated. From the resultant reaction effluent which was in an emulsion state, 1,400 ml was collected as a sample. It was then transferred into a 2 liter-mixing vessel furnished with a baffle. While thoroughly stirring the sample, 0.03 g of triethylamine and 10 g of a 25% aqueous NaOH solution were added thereto. They were allowed to react for 30 minutes. The reaction solution was allowed to stand and the resulting methylene chloride solution of an oligomer contained 0.18 eq./l of —OCOCl groups, 0.05 eq./l of —COCl groups and 0.08 eq./l of —OH groups. The molar ratio of the —OH groups to the (—OCOCl+—COCl) groups was 0.35 while that of the —COCl groups to the —OCOCl groups was 0.27.

Five hundred milliliters of the above methylene chloride solution o the oligomer were charged in a 1 liter-separable flask equipped with a baffle. While agitating the methylene chloride solution, were added 200 ml of a 4.5% aqueous NaOH solution and 0.05 g of triethylamine. They were subjected to a polycondensation reaction for 1.5 hours.

The reaction mixture was allowed to stand. The resulting methylene chloride solution of a resin was diluted with 900 ml of methylene chloride so as to adjust its resin concentration to about 4%. The thus-diluted solution was washed in the same manner as in Example 1. The separativeness of the methylene chloride solution and water content in the thus-separated methylene chloride solution are shown in Table 9.

TABLE 9

| Step | Agitation and mixing Aqueous washing solution | Ratio of water phase | Time (min) | Stationary separation Time (min) | Separa- tiveness | Water content of methylene chloride solution (%) |
|---|---|---|---|---|---|---|
| 1 | 0.1 N— HCl | 0.3 | 10 | 1 | good | 0.38 |
| 2 | water | 0.3 | 10 | 12 | good | 0.30 |
| 3 | water | 0.3 | 10 | 17 | good | 0.26 |

The thus-washed and purified methylene chloride solution of the resin was evaporated to dryness, thereby obtaining the resin. Its analyses gave the following results:

$[\eta] = 0.50$;

Bisphenol A residue:terephthalic acid residue:carbonate bond = 1:0.49:0.51 in molar ratio;

—OH group content: 4.9 μeq./g;

—COOH group content: 3.8 μeq./g;

Residual bisphenol A: 150 ppm; and

Neither —OCOCl groups nor —COCl groups were traced.

The resin was heated for 5 minutes in a melt indexer maintained at 300° C. and then extruded. $[\eta]$ of the thus-extruded resin was 0.50.

EXAMPLE 8

A tubular reactor was operated under the same conditions as employed in Example 6. The resultant reaction effluent was in an emulsion state. One thousand and four hundred milliliters were collected as a sample. It was then transferred into a 2 liter-mixing vessel equipped with a baffle. While thoroughly mixing the content, were added a solution prepared by dissolving 6 g of bisphenol A in 45 ml of a 5.6% aqueous NaOH solution, 10 g of a 25% aqueous NaOH solution and 0.015 g of triethylamine. They were allowed to react for 30 minutes. The reaction solution was allowed to stand. The resulting methylene chloride solution of an oligomer contained 0.17 eq./l of —OCOCl groups, 0.05 eq./l of —COCl groups and 0.12 eq./l of —OH groups. The molar ratio of the —OH groups to the (—OCOCl+—COCl) groups was 0.55 while that of the —COCl groups to the —OCOCl groups was 0.29.

Five hundred milliliters of the above methylene chloride solution of the oligomer were charged into a separable flask furnished with a baffle. While stirring the methylene chloride solution, were added a solution prepared by dissolving 2 g of bisphenol A in 160 ml of a 4% aqueous NaOH solution as well as 0.02 g of triethylamine. They were subjected to a polycondensation reaction for 2 hours. The molar ratio of the —OH groups to the (—OCOCl+—COCl) groups in the polycondensation system had been raised to 0.70, because the —OH group content was increased owing to the addition of bisphenol A.

The reaction mixture was allowed to stand, whereby separating a methylene chloride solution of a resin. Its resin concentration was adjusted to about 4% by adding 900 ml of methylene chloride thereto. Then, it was washed in the same manner as in Example 1. The separativeness of the methylene chloride solution and the water content in the thus-separated methylene chloride solution are given in Table 10.

TABLE 10

| Step | Agitation and mixing Aqueous washing solution | Ratio of water phase | Time (min) | Stationary separation Time (min) | Separa- tiveness | Water content of methylene chloride solution (%) |
|---|---|---|---|---|---|---|
| 1 | water | 1.5 | 10 | 15 | good | 1.5 |
| 2 | 0.1 N— HCl | 0.3 | 10 | 1 | good | 0.28 |
| 3 | water | 0.3 | 10 | 19 | good | 0.27 |
| 4 | water | 0.3 | 10 | 25 | good | 0.28 |

The thus-washed and purified methylene chloride solution of the resin was evaporated to dryness, thereby obtaining the resin. Its analyses gave the following results:

$[\eta] = 0.51$;

Bisphenol A residue:terephthalic acid residue:carbonate bond = 1:0.48:0.52 in molar ratio;

—OH group content: 8.5 μeq./g;

—COOH group content: 3.0 μeq./g;

Residual bisphenol A: 260 ppm;

Neither —OCOCl groups nor —COCl groups were traced.

The resin was heated for 5 minutes in a melt indexer maintained at 300° C. and then extruded. $[\eta]$ of the thus-extruded resin was 0.50.

We claim:

1. In a method for preparing an aromatic polyesterpolycarbonate containing dihydroxy-diaryl compound residues, terephthalic acid and/or isophthalic acid residues and carbonate groups in a molar ratio of 1:0.25–0.75:0.75–0.25 by the interfacial polymerization method, the improvement comprising:

mixing and reacting an aqueous alkaline solution of a dihydroxy-diaryl compound, an organic solvent solution of terephthaloyl chloride and/or isophthaloyl chloride and phosgene thereby obtaining a polyesterpolycarbonate oligomer containing —OCOCl, —COCl and —OH end groups, the molar ratio of said —OH groups to the sum of said —OCOCl and —COCl groups being not greater than 1 and the molar ratio of said —COCl groups to said —OCOCl groups being no more than 2.5; and polycondensing said oligomer in a solution of a caustic alkali, said oligomer containing substantially no dihydroxy-diaryl compound.

2. The method of claim 1, wherein the molar ratio of dihydroxy-diaryl compound residues:terephthalic acid and/or isophthalic acid residues:carbonate groups in said polyesterpolycarbonate is 1:0.33–0.7:0.67–0.3.

3. The method of claim 1, wherein the molar ratio of dihydroxy-diaryl compound residues:terephthalic acid and/or isophthalic residues:carbonate groups in said polyesterpolycarbonate is 1:0.33–0.6:0.67–0.4.

4. The method of claim 1, wherein the molar ratio of the —OH groups to the sum of said —OCOCl and —COCl groups in said polyesterpolycarbonate oligomer is 0.01–0.9.

5. The method of claim 1, wherein the molar ratio of the —COCl groups to the —OCOCl groups in said polyesterpolycarbonate ranges from 0.25–2.0.

6. The method of claim 1, wherein in said oligomer formation step, the molar ratio of terephthaloyl chloride and/or isophthaloyl chloride plus phosgene to dihydroxy-diaryl compound reactant is 0.8–2.0.

7. The method of claim 1, wherein in said oligomer formation step, the molar ratio of phosgene to terephthaloyl chloride and/or isophthaloyl chloride reactant is 0.4–4.

8. In a method for preparing an aromatic polyesterpolycarbonate containing dihydroxy-diaryl compound residues, terephthalic acid and/or isophthalic acid residues and carbonate groups in a molar ratio of 1:0.25–0.75:0.75–0.25 by the interfacial polymerization method, the improvement comprising:

mixing and reacting an aqueous alkaline solution of a dihydroxy-diaryl compound, an organic solvent solution of terephthaloyl chloride and/or isophthaloyl chloride and phosgene under conditions in which the molar ratio of terephtholoyl chloride and/or isophthaloyl chloride plus phosgene to dihydroxy-diaryl compound reactant is 0.8–2.0 and in which the molar ratio of phosgene to terephthaloyl chloride and/or isophthaloyl chloride is 0.4–4, thereby obtaining a polyesterpolycarbonate oligomer containing —OCOCl, —COCl and —OH end groups, the molar ratio of said —OH groups to the sum of said —OCOCl and —COCl groups being not greater than 1 and the molar ratio of said —COCl groups to said —OCOCl groups being no more than 2.5; and polycondensing said oligomer in a solution of a caustic alkali, said oligomer containing substantially no dihydroxy-diaryl compound.

* * * * *